(12) United States Patent
McCrary

(10) Patent No.: US 6,505,446 B1
(45) Date of Patent: Jan. 14, 2003

(54) SIMULATED WOOD STRUCTURE TO ACT AS LARGE WOODY DEBRIS AND METHOD FOR MANUFACTURE

(76) Inventor: Homer T. McCrary, 310 Swanton Rd., Davenport, CA (US) 95017

( * ) Notice: Subject to any disclaimer, the term of this patent is extended or adjusted under 35 U.S.C. 154(b) by 0 days.

(21) Appl. No.: 09/723,922
(22) Filed: Nov. 27, 2000
(51) Int. Cl.[7] ................................ E04B 1/10
(52) U.S. Cl. .................. 52/233; 52/309.7; 52/600
(58) Field of Search .................. 52/233, 314, 286, 52/724.1, 600, 649.1; 47/65.5; 428/18

(56) References Cited

U.S. PATENT DOCUMENTS

| | | | | |
|---|---|---|---|---|
| 657,050 A | * | 8/1900 | Bick et al. | |
| 767,175 A | * | 8/1904 | Sibole | |
| 2,779,058 A | * | 1/1957 | Hyde | ............. 18/27 |
| 4,433,519 A | * | 2/1984 | Jenkins | ............. 52/233 |
| 4,920,693 A | * | 5/1990 | Meade et al. | ............. 47/41.12 |
| 5,253,458 A | * | 10/1993 | Christian | ............. 52/233 |
| 5,271,888 A | * | 12/1993 | Sinsley | ............. 264/87 |

* cited by examiner

*Primary Examiner*—Carl D. Friedman
*Assistant Examiner*—Basil Katcheves
(74) *Attorney, Agent, or Firm*—Donald R. Boys; Central Coast Patent Agency, Inc.

(57) ABSTRACT

A cast-concrete simulated log has a longitudinal axis and an outside surface simulating a natural log appearance, and also has at least one triangular rebar reinforcement embedded in the concrete in a plane at substantially a right angle to the longitudinal axis, with corners of the triangular rebar exposed at the outside surface, such that the exposed corners of the rebar triangle are available as connection points for attachment to other structures or for lifting and manipulating the log. In some cases there are two or more embedded rebar triangles spaced along the length of the log, and the concrete is colored to simulate the color of a natural log. Concrete logs are assembled to simulate large-woody-debris.

9 Claims, 5 Drawing Sheets

SIMULATED WOOD STRUCTURE TO ACT AS LARGE WOODY DEBRIS AND METHOD FOR MANUFACTURE

FIELD OF THE INVENTION

The present Invention is in the field of waterway rehabilitation and pertains more particularly to simulated large woody debris and methods for manufacturing same.

BACKGROUND

For many years it had been a practice to remove debris, such as logs or brush piles from streams. In many cases this was ostensibly to enhance appearance and visual esthetics or improve hydraulic conveyance. Unfortunately, the ultimate result was more usually detrimental to the stream and its faunal inhabitants, both insect and vertebrate. Natural pools were lost and streams tended to fill and braid. The result was frequent loss of habitat and greatly changed hydraulic characteristics.

Stream habitat restoration and management reportedly began in the United States in Michigan in the 1920's. Early structures were designed and installed with little understanding of the ecology of stream systems. Most structures were approached as civil works. It wasn't until the 70s that aquatic biologists, fisheries scientists and hydrologists began to more fully understand the role of woody debris in stream ecosystems and the associated limitations of artificial in-stream structures. By the early 1980's the role of large woody debris associated with old-growth forests became the focal point for intense study. Today, stream restoration and improvement projects almost universally include large woody debris elements. A large body of literature has developed relative to the importance of large woody debris and its most efficient placement in streams.

Large woody debris is not uniformly defined among stream ecologists but historically it has usually been considered as fallen trees and logs with major diameters of about 20 inches or greater. In northwestern United States the term is almost universally used in reference to the fallen large trees found in virgin old growth forests. These trees frequently have been uprooted from stream banks by undercutting and retain large root wads that help to anchor and stabilize them.

While organic debris of all sizes is generally recognized as important for maintaining the biotic and abiotic functions of stream channels, large woody debris is critical. Large woody debris has a major influence on channel form, sediment transport and deposit patterns. The quantity of large woody debris in a channel system is highly correlated with the number of pools. Many experts state that large woody debris of proportions associated with old growth forests will be lacking for at least the next hundred years. It has been suggested that loggers and landowners not log trees that are within 150 feet of a stream so that they will eventually fall into that stream thereby providing large woody debris to that stream. Legislation has been suggested in this area also.

The demand for large woody debris to use in stream restoration has resulted in scarcity and rapidly increasing costs. The dominant source of large woody debris is from flood debris clean-up, land clearing, and road building projects. Contractors now recognize that waste wood and stumps have a market value and the cost has risen accordingly.

Modification of stream channels to improve habitat dates from the early 1900s. The most common methods to improve or manage instream habitat and/or hydrology include current deflectors, low-head dams, weirs, planted vegetation and boulder placement. Placement of large woody debris is a relatively recent advancement, driven by the recognition that it provides many previously under-appreciated functional values. Because of the scarcity of large woody debris and high expense for placement, logs are placed in the stream and anchored to the bedrock, anchor rocks, or stream banks with steel cables. Cabling is necessary to prevent the relatively light logs from being washed downstream where they might collect in logjams or against public or private structures. This approach has a number of limitations. First, the logs used are otherwise merchantable and have significant value. Second, Logs tend to rot and are therefore not a long-term solution. Third, logs are buoyant with a specific gravity of around 0.44 to 0.55. With moderate to high water flow in winter a large percentage placed woody debris logs are washed downstream into private or public structures with a potential to cause considerable damage. Forth, in the event the logs washed downstream do not damage bridges or other private structures the will eventually end up on beaches or clogging up lakes where they can become very hazardous to boaters and the like.

What is clearly needed is an alternative to natural woody debris that is heavy enough to stay in place, cost effective, has the exact look and feel of natural woody debris, easily transportable by helicopter and conventional means, will last for hundreds of years.

SUMMARY OF THE INVENTION

In a preferred embodiment of the present invention a cast-concrete simulated log having a longitudinal axis and an outside surface simulating a natural log appearance is provided, the log also having at least one triangular rebar reinforcement embedded in the concrete in a plane at substantially a right angle to the longitudinal axis, with corners of the triangular rebar exposed at the outside surface, such that the exposed corners of the rebar triangle are available as connection points for attachment to other structures or for lifting and manipulating the log.

In some embodiments the log has two or more embedded rebar triangles spaced along the length of the log, and also in some embodiments the concrete is colored to simulate the color of a natural log.

In another aspect of the invention large-woody-debris assembly is provided, comprising two or more cast-concrete simulated logs, each having a longitudinal axis and an outside surface simulating a natural log appearance, and each having at least one triangular rebar reinforcement embedded in the concrete in a plane at substantially a right angle to the longitudinal axis, with corners of the triangular rebar exposed at the outside surface, the two or more simulated logs connected to one another between corners of the rebar triangles on each log. There may be two or more triangular rebar reinforcements embedded at different position along the longitudinal axis of each simulated log, and in some embodiments there are three simulated logs connected in a close triangular arrangement between exposed corners of the rebar triangles in each simulated log. The concrete may be colored to simulate the color of a natural log.

In yet another aspect a mold for forming a cast-concrete simulated log is provided, comprising a first mold element having a length and a semicircular cross-section, a second mold element having substantially the same length and semicircular cross section as the first mold element, the second mold element hinged to the first such that the two mold elements may be closed to form a circular mold having an inside surface, and a polymer lining adherent to the inside surface of each mold element, the polymer lining having itself an inside surface formed as a female replica of a surface of a natural log.

In some embodiments the polymer lining is created by suspending a natural log within a closed mold, the log substantially evenly spaced apart from the inside surface of the mold elements, creating thereby an annular cavity between the log and the mold elements, pouring a polymer material into the annular cavity, curing the polymer, and removing the log.

In yet another aspect of the invention a method for creating a cast-concrete simulated log is provided, comprising the steps of (a) creating a mold with a length and a substantially circular cross-section, the mold having an inside surface simulating the appearance of a natural log; (b) suspending at least one triangular rebar in a plane substantially at a right angle to the length; and (c) casting concrete in the mold such that, when opened, the cast-concrete simulated log has an outer surface simulating a natural log, and all three corners of the triangular rebar are exposed at the outer surface of the simulated log.

In some embodiments of the two or more triangular rebars are suspended at different places along the length of the mold, to create two or more reinforcements with exposed corners suitable for connecting to other structures and for picking up and placing the simulated log. There may also be a step for coloring the concrete to more closely simulate the appearance of a natural log.

In still another aspect of the invention a method for forming a large-woody-debris assembly is provided, comprising (a) forming two or more cast-concrete simulated logs, each having a longitudinal axis and an outside surface simulating a natural log appearance, and each having at least one triangular rebar reinforcement embedded in the concrete in a plane at substantially a right angle to the longitudinal axis, with corners of the triangular rebar exposed at the outside surface; and (b) connecting the two or more simulated logs to one another between corners of the rebar triangles on each log. In some preferred embodiments three logs are formed, each having two or more triangular rebar reinforcements spaced along the longitudinal axis, and the three logs are assembled into a close triangular grouping by connection between the rebar corners.

In embodiments of the invention taught in enabling detail below, for the first time simulated large woody debris is provided in an economical manner, and in a durable form that may be expected to remain in place for a long time after placement in a stream bed. Further, means for easy manipulation and placement is provided.

BRIEF DESCRIPTION OF THE DRAWINGS

FIG. 1b is a perspective view of one mold section from FIG. 1a.

DESCRIPTION OF EMBODIMENTS

Figure 1A:
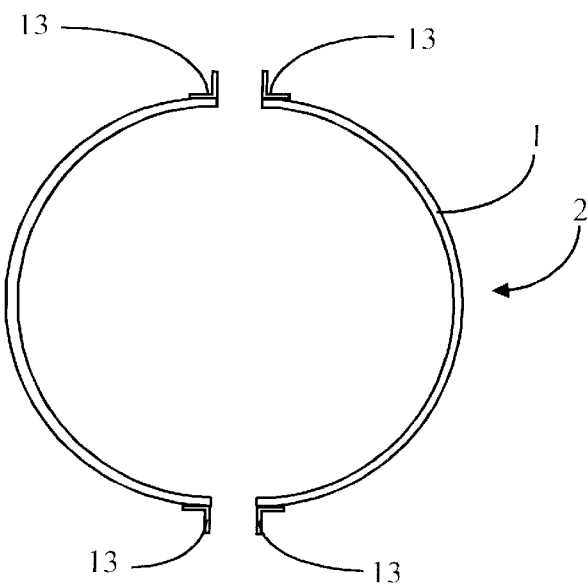
FIG. 1a is an end view of two mold sections for forming a mold according to one embodiment of the present invention.
Figure 1B:
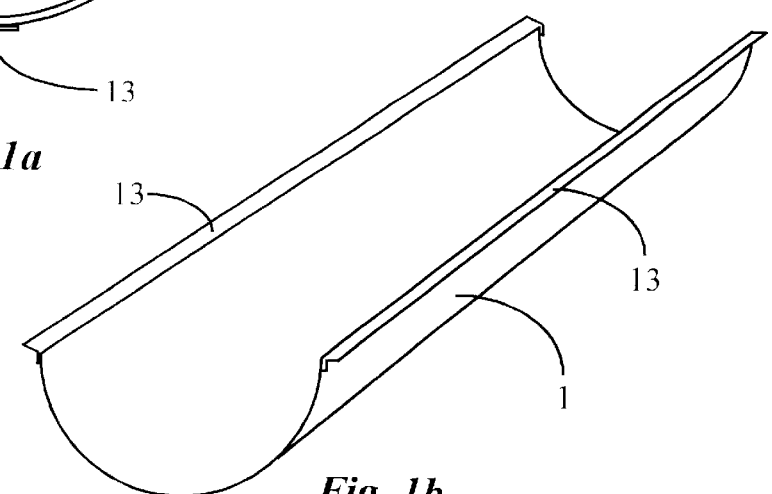
Figure 1C:
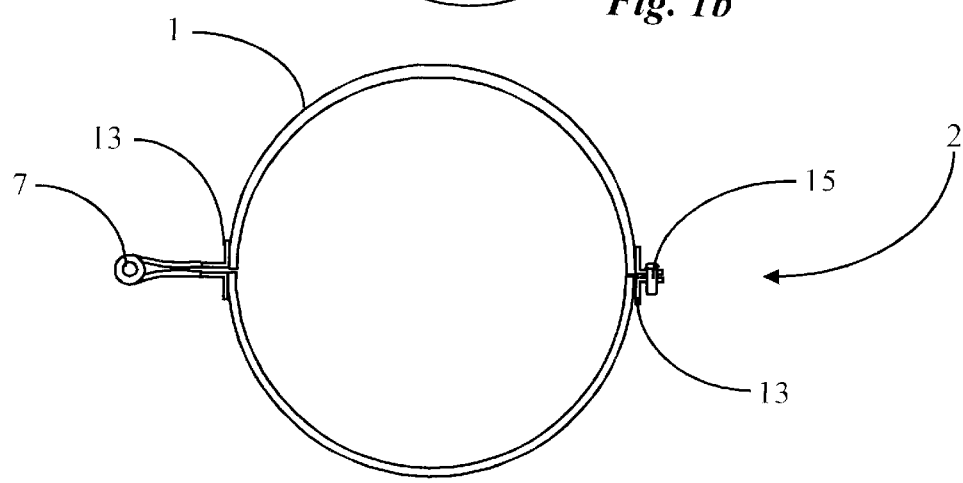
FIG. 1c is an end view of a closed mold according to one embodiment of the present invention including a hinge and attachment means of the opening side.

In a one embodiment of the present invention, referring to FIGS. 1a and 1b, a 10-foot length of steel pipe 1 with an outside diameter of approximately 20 inches is used as a mold 2. It is known to the inventor that any length or diameter of pipe can be used to create any size mold 2 desired. Two lengths of angle iron 13 are welded onto the opposite edges of the pipe along its length before cutting the pipe 1 into separate pieces. This is done to reduce the "spring apart" action that occurs as this type of pipe is cut into two pieces. Two additional pieces of angle iron 13 are welded along the length of the two pipe sections 1 as shown in FIGS. 1a and 1b. Referring to FIG. 1c hinges are then fabricated and welded to one side of pipe sections 1 in several places along the length of pipe sections 1 in a fashion to allow them to open and close in a "clam shell" fashion. Flanges 13 opposite the hinged side of the mold 2 are drilled and prepared to accept bolts 15. Several bolts 15 run the length of the pipe section 1 sufficient to close and fasten the mold 2.

Figure 2A:
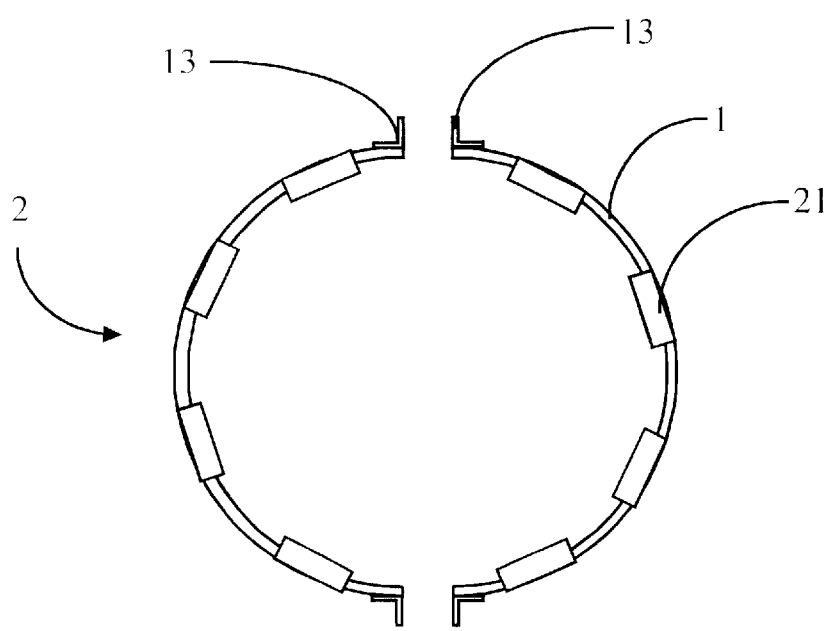
FIG. 2a is an end view of two mold sections for forming a mold according to one embodiment of the present invention.
Figure 2B:
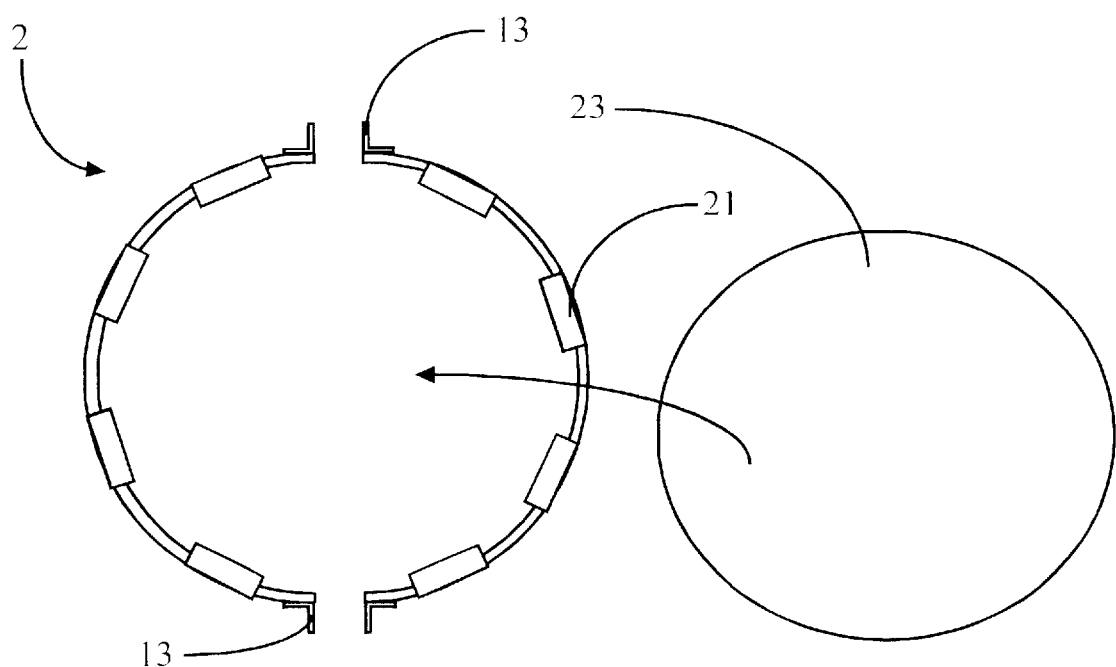
FIG. 2b is an end view of the two mold sections of FIG. 2a, showing placement of an end closure element.

Referring now to FIGS. 2a–2b. Additional angle iron flanges 21 are welded to both ends of the two pipe sections 1 to allow insertion and retention of the two end closure elements 23 (end caps) into the mold 2 sufficient to close off both ends of the mold 2.

Figure 4A:
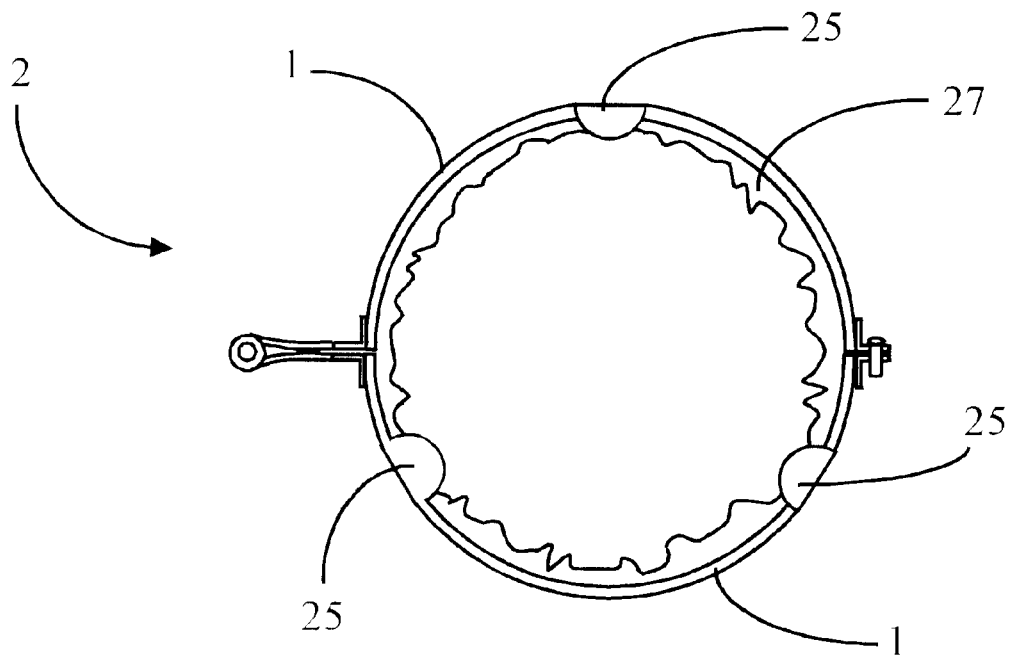
FIG. 4a is an end view of a mold with urethane material attached and polyurethane foam plugs in place ready for concrete pouring according to one embodiment of the present invention.
Figure 4B:
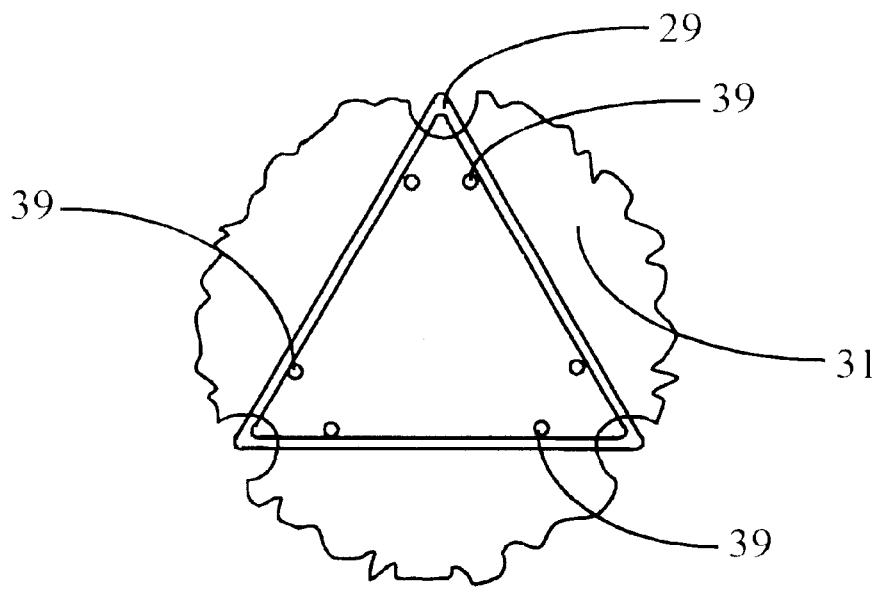
FIG. 4b is an end view of a concrete log with rebar attachment points installed according to one embodiment of the present invention.

Referring to FIG. 4a, a plurality of polyurethane foam plugs (or other suitable material) are inserted into mold 2 every 120 degrees around the circumference in any number of desired places to allow for rebar pieces 29 FIG. 4b to be inserted prior to the pouring of concrete. The purpose of rebar pieces 29 are to allow the concrete logs 31 to be lifted, moved and attached to one another. The novel aspect of rebar pieces 29 is that the triangle shape allows the entire weight of concrete log 31 to be lifted by any one of the attachment points. The triangle shapes of rebar pieces have the effect of lifting the concrete log 31 by the bottom thereby avoiding breakage when lifting. Additional lengths of rebar 39 may be attached to the rebar pieces 29 along the length of concrete log 31 to add additional strength.

Figure 3A:
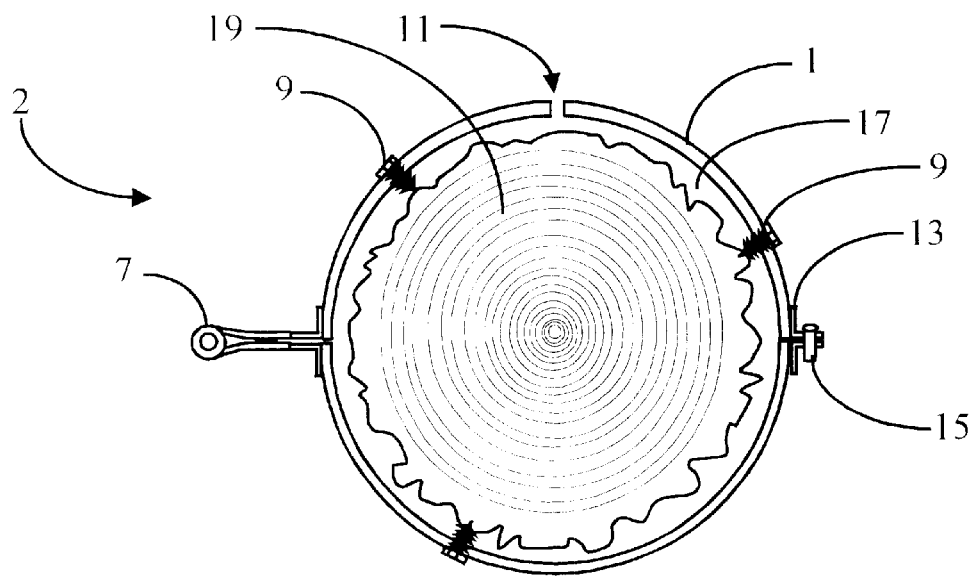
FIG. 3a is an end view of a mold with a suspended log prepared for urethane injection according to one embodiment of the present invention.
Figure 3B:
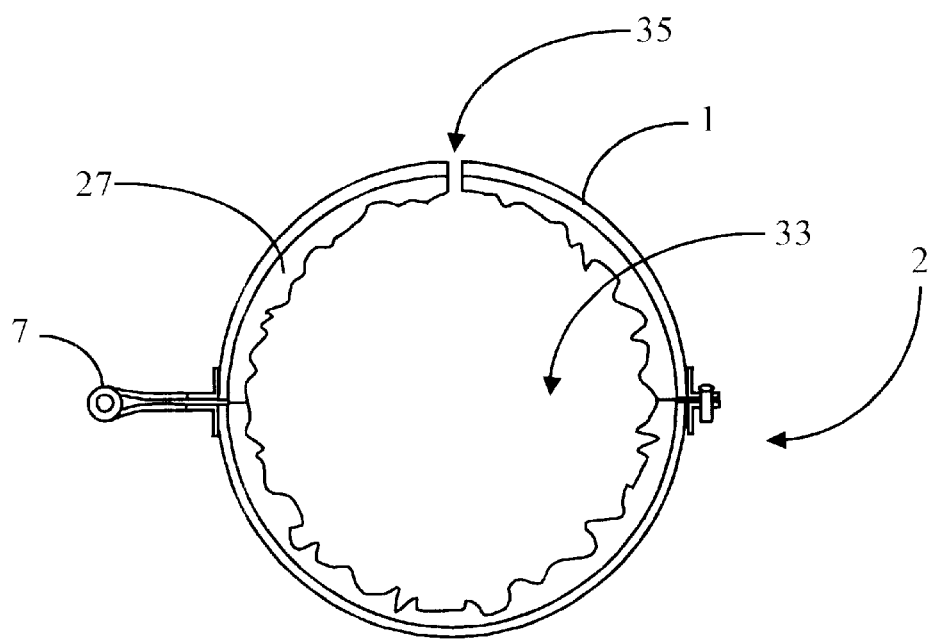
FIG. 3b is an end view of a mold with urethane material attached ready for concrete pouring according to one embodiment of the present invention.

Referring now to FIG. 3a–3b. A real log 19 is suspended in closed mold 2 by a plurality of lag bolts 9 sufficient to create a space 17 to pour or inject urethane material. It is known to the inventor that the urethane material can also be sprayed onto log 19. Log 19 is treated/sprayed with a release agent (not shown) prior to placement into mold 2 to insure easy removal of urethane material after it is cured. Urethane material is then injected/poured via one or more ports 11 sufficient to completely surround log 19 including the ends (not shown) and allowed to set up or cure.

Referring to FIGS. 3a and 3b, after log 19 is removed, urethane material pieces 27 removed from log 19 and fastened by adhesive or screws to the inside of mold 2 (including ends not shown) creating cavity 33 FIG. 3b. Cavity 33 is then filled with concrete (not shown) via one or more ports 35. Concrete is colored to match the type of log desired i.e. pine, fir, redwood etc. The concrete is cured, the mold 2 is opened, and concrete log is removed from the mold.

Figure 5:
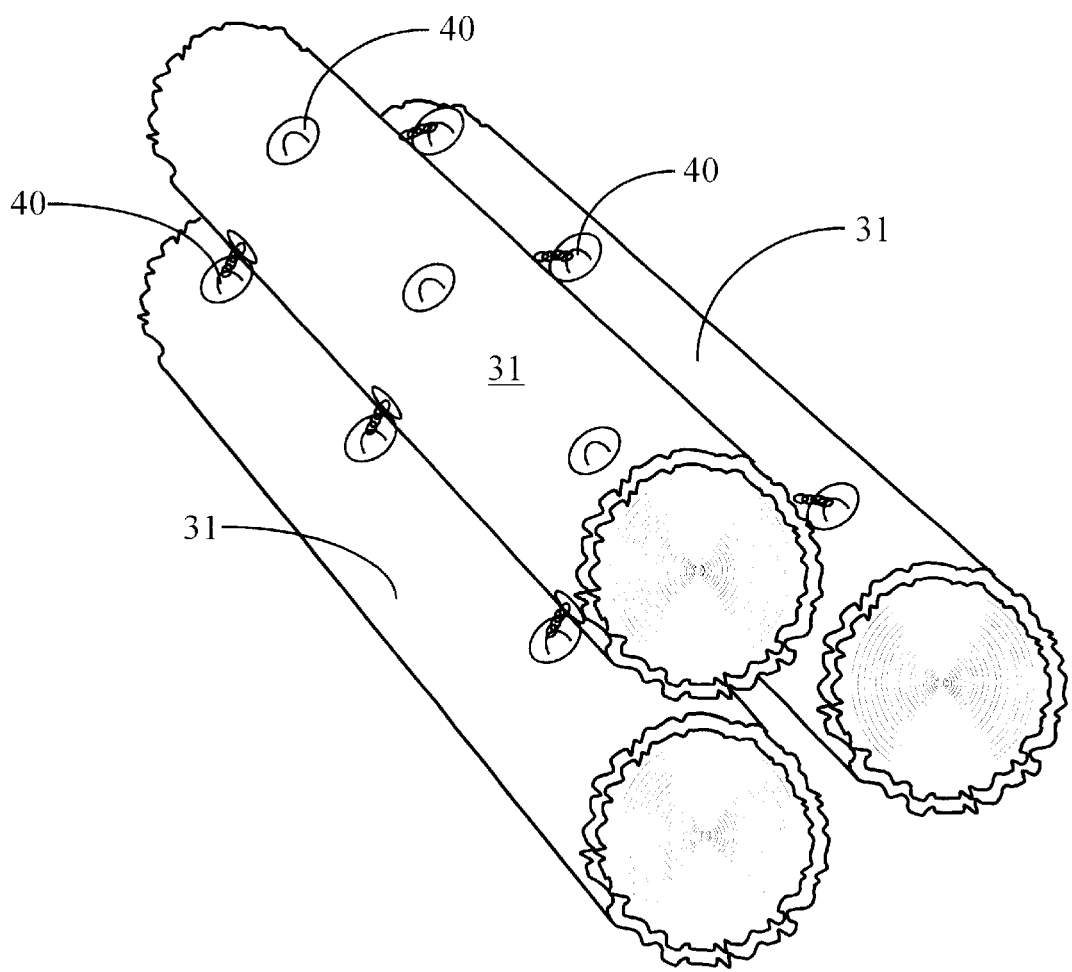
FIG. 5 illustrates an attached arrangement of completed concrete logs according to one embodiment of the present invention.

FIG. 5 illustrates an arrangement of concrete logs 31 attached by their attachment points 40. Any number of logs 31 may be attached in this way. A plurality of real logs may also be attached to a concrete log 31. Any number of concrete logs 31 can act as an anchoring device when attached to any number of real logs (not shown).

Concrete logs 31 alone or in combination with any number of real logs will:

1. Create and enhance a wide variety of aquatic habitats and pools.
2. Stabilize and protect stream channels and banks.
3. Control, manage and direct stream flow and sinuosity.
4. Anchor complex habitat elements including root wads, branches and other woody debris.
5. Increase biological activity, bio-diversity and stimulate aquatic food production.
6. Can make an ideal monitoring station.

Some advantages of the these novel concrete logs are as follows:

1. Non-buoyant and far more stable than wood.
2. Easier and faster to install with conventional construction equipment or helicopters.
3. More cost effective that natural wood assuring more habitat enhancement per dollar.
4. Installation is less disruptive to the stream environment.
5. Readily available.
6. Not necessary to harvest large old growth trees to obtain desirable extra large woody debris.
7. Can be custom designed and configured to address specific situation or fill a particular need.

It is known to the inventor that the specific gravity of these concrete logs can be adjusted to order by varying the mixture (lightweight concrete) and or introducing air bubbles to the concrete. A unique adjustment of the mixture of concrete can also change the strength and hardness of concrete logs. Another novel aspect of the present invention (not shown) is the spraying of an organic material layer (made with processed wood) with an organic adhesive additive to bond the organic matter to the outside of the concrete log. This addition further enhances the concrete logs ability to harbor natural insects and aquatic life that feeds or otherwise depends on natural wood for their livelihood.

In another embodiment the urethane material is brushed or sprayed on the log and the urethane is then cut from the log and put in a mold for the pouring of concrete.

In another embodiment the urethane material is brushed or sprayed on the log and fiberglass or other suitable material is laid over the urethane material to form a rigid shell that is then used for the mold.

In another embodiment a plain or limited textured log is used as an anchor for other real logs.

In still another embodiment the textured or limited textured concrete log is manufactured and a wood particle material is pressed onto the outer shell of the concrete log. This wood particle material pressed onto the concrete log can be very thick and textured by a press or other means. The wood particle material can be made from wood waste and colored with a non-toxic dye to closely resemble a natural log. The purpose of this is to have a log that still operates as large woody debris after the outer shell is rotted away.

It will be apparent to the skilled artisan that there are a broad variety of alterations that may be made in the several embodiments of the present invention taught herein, without departing from the spirit and scope of the invention. The invention is to be limited only by the claims which follow.

What is claimed is:

1. A cast-concrete simulated log having a longitudinal axis and an outside surface simulating a natural log appearance, and also having at least one triangular rebar reinforcement embedded in the concrete in a plane at substantially a right angle to the longitudinal axis, with corners of the triangular rebar exposed at the outside surface, such that the exposed corners of the rebar triangle are available as connection points for attachment to other structures or for lifting and manipulating the log.

2. The simulated log of claim 1 comprising two or more embedded rebar triangles spaced along the length of the log.

3. The simulated log of claim 1 wherein the concrete is colored to simulate the color of a natural log.

4. A large-woody-debris assembly comprising:
   two or more cast-concrete simulated logs, each having a longitudinal axis and an outside surface simulating a natural log appearance, and each having at least one triangular rebar reinforcement embedded in the concrete in a plane at substantially a right angle to the longitudinal axis, with corners of the triangular rebar exposed at the outside surface, the two or more simulated logs connected to one another between corners of the rebar triangles on each log.

5. The assembly of claim 4 comprising two or more triangular rebar reinforcements embedded at different position along the longitudinal axis of each simulated log.

6. The assembly of claim 4 comprising three simulated logs connected in a close triangular arrangement between exposed corners of the rebar triangles in each simulated log.

7. The assembly of claim 4 wherein the concrete is colored to simulate the color of a natural log.

8. A method for forming a large-woody-debris assembly comprising:
   (a) forming two or more cast-concrete simulated logs, each having a longitudinal axis and an outside surface simulating a natural log appearance, and each having at least one triangular rebar reinforcement embedded in the concrete in a plane at substantially a right angle to the longitudinal axis, with corners of the triangular rebar exposed at the outside surface; and
   (b) connecting the two or more simulated logs to one another between corners of the rebar triangles on each log.

9. The method of claim 8 wherein, in step (a), three logs are formed, each having two or more triangular rebar reinforcements spaced along the longitudinal axis, and in step (b) the three logs are assembled into a close triangular grouping by connection between the rebar corners.

* * * * *